United States Patent [19]

Bauer

[11] 4,298,350

[45] Nov. 3, 1981

[54] METHOD OF EMBRITTLING WASTE

[75] Inventor: Hans F. Bauer, Dana Point, Calif.

[73] Assignee: Occidental Research Corporation, Irvine, Calif.

[21] Appl. No.: 76,009

[22] Filed: Sep. 17, 1979

[51] Int. Cl.$^3$ .................................................. C10L 9/08
[52] U.S. Cl. ........................................ 44/1 C; 44/1 D
[58] Field of Search ................. 44/1 C, 1 D, 1 R, 1 F

[56] References Cited

U.S. PATENT DOCUMENTS 4,008,053  2/1977  Brenneman et al. .................. 44/1 D
4,063,903  12/1977  Beningson et al. ................... 44/1 D Primary Examiner—Carl F. Dees

[57] ABSTRACT

The instant invention relates to a method of converting the solid organic fraction of solid waste into a powdered fuel which comprises heating said solid organic fraction in an inert atmosphere for a time and at a temperature sufficient to embrittle said solid organic fraction without causing substantial decomposition, pyrolysis, or dry weight loss of said solid organic fraction, comminuting said embrittled solid organic fraction to a powder which is less than a predetermined particle size, and recovering said powder. The inert atmosphere will comprise less than 1% by weight oxygen and is preferably a mixture of carbon oxides and nitrogen. The embrittling process takes place at a temperature of at least 125° C., preferably from 150° C. to 250° C. and said embrittled solid organic fraction is preferably comminuted to a predetermined particle size of less than 10 mesh.

20 Claims, 1 Drawing Figure

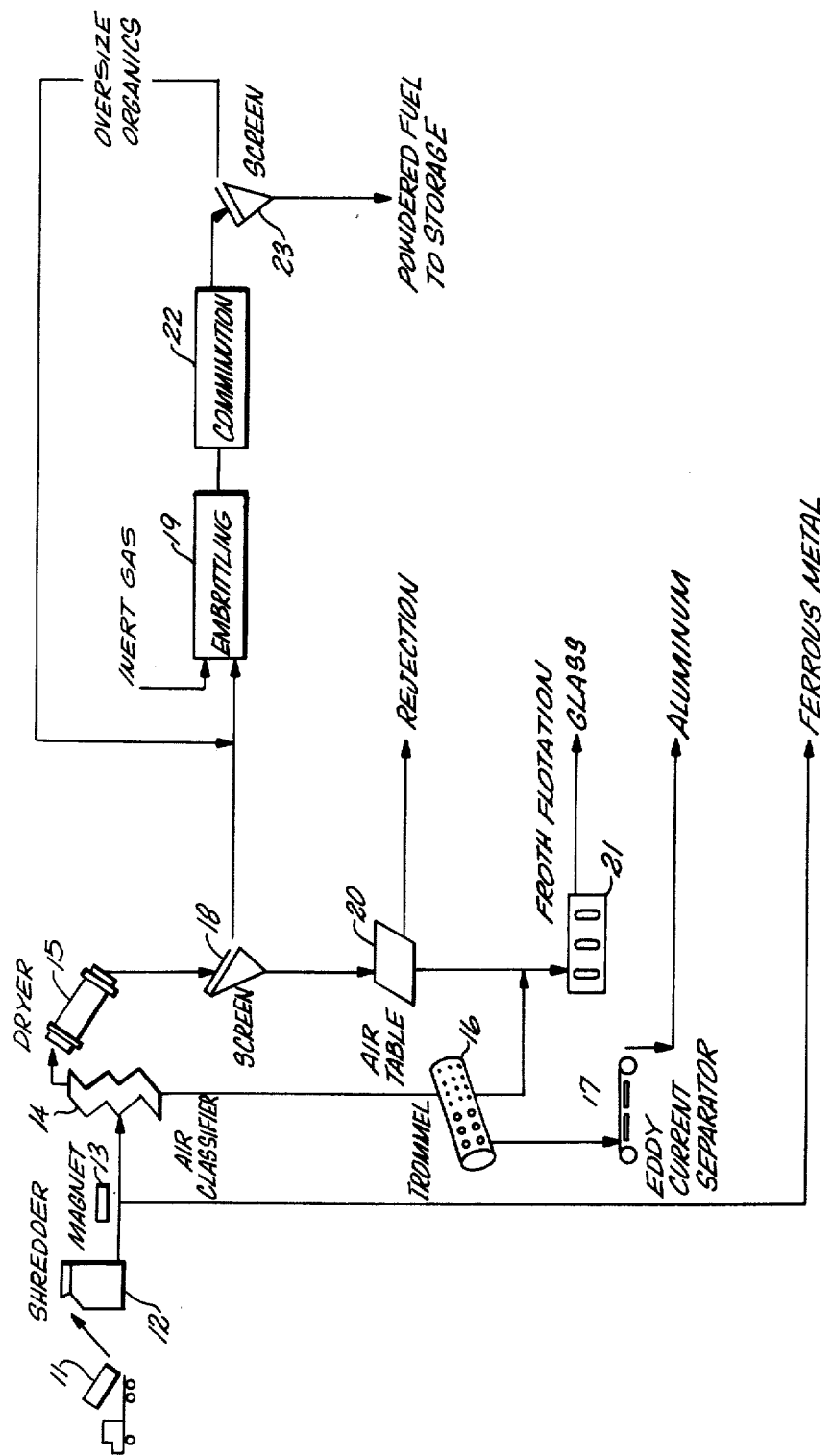

METHOD OF EMBRITTLING WASTE

BACKGROUND OF THE INVENTION

1. Field of the Invention

The instant invention relates to making a powdered fuel from municipal or other solid waste sources by embrittling the solid organic fraction of said waste at elevated temperatures in an inert atmosphere without causing substantial decomposition, pyrolysis or dry weight loss of said solid organic fraction. After embrittlement, the embrittled solid organic fraction is comminuted, e.g. by grinding and a powdered fuel having a high caloric value is recovered. The powdered fuel may be used as is or can be cofired with other fuels such as heating oils or coal.

2. Description of the Prior Art

Many processes for the reclamation of various valuable materials from waste sources are known. For example, municipal solid waste may be a source of aluminum, ferrous metals, glass, plastics, paper and textiles.

In an exemplary process for the separation of valuable materials from solid waste sources, the incoming waste is shredded to reduce the waste to easily handled particle size, e.g. less than 4 inches. The shredded waste may be passed through a magnetic field to remove ferrous metals and subjected to air-classification to separate the lighter materials, such as the various organics present in the waste, from the heavier materials such as glass, rock, dirt, etc. The heavier materials may be further treated to remove the electroconductive, nonmagnetic metals, e.g. aluminum fragments by processes that rely on the electroconductive nature of aluminum to separate it from admixture with other materials. The glass may be recovered by froth flotation processes. Finally, the lighter materials from the air-classification may be burned to provide heat or pyrolyzed to provide gaseous or liquid products. In general, the objective of municipal waste treatment processes is to recover all valuable materials and minimize the amount of said waste that must be disposed of as landfill.

In a process described in U.S. Pat. Nos. 3,961,913 and 4,008,053, the solid organic fraction of municipal waste or other waste is converted into a powdered fuel. In the process described in these patents a mineral acid is used to embrittle the organic fraction and said embrittled organic fraction is then ground to a powdered fuel. The difficulty inherent in this process is that the mineral acids such as hydrochloric acid or sulphuric acid, while efficient for embrittling the solid organic fraction, leave various undesirable moieties in the powdered fuel. For example, fuel derived from the solid organic fraction of municipal solid waste is, in and of itself, very low in sulphur. When sulphuric acid, however, is utilized as the embrittling agent in the above process, significant amounts of sulphur remain in the powdered fuel that is recovered. It is known in the art that the burning of sulphur containing fuels is undesirable from an environmental standpoint.

The use of hydrochloric acid as the embrittling agent results in a significant amount of chlorine in the powdered fuel recovered from the process. Hydrochloric acid causes corrosion problems, during the embrittlement process as well as during the burning of the powdered fuel derived from the hydrochloric acid embrittlement process. In order to use the above powdered fuels, additional treatment of the fuel to remove sulphur of chlorine is required prior to or during the combustion process to prevent these undesirables from entering the environment. These additional requirements, of course, decrease the value of the solid fuel made by the process described in the above patents.

Another reference which suggests the use of chemical embrittling agents to facilitate the conversion of the solid organic fraction of municipal solid waste into a powdered fuel is EPA-600/7-78-143, August, 1978 entitled Investigation of Advanced Thermal-Chemical Concepts for Obtaining Improved MSW-Derived Products. While this reference acknowledges that the prior art taught that municipal solid waste could be pyrolyzed to obtain solid fuel products while simultaneously producing liquid and gaseous products by substantial decomposition of the solid organic fraction, it did not suggest a process wherein substantially all of the solid organic fraction of municipal solid waste was converted into a powdered fuel in the absence of chemical embrittling agents.

The above problems with the prior art processes for preparing powdered solid fuel from municipal and other waste sources are overcome by the method of the instant invention.

BRIEF SUMMARY OF THE INVENTION

The instant invention relates to a method of converting the solid organic fraction of waste into a powdered fuel which comprises heating said solid organic fraction in an inert atmosphere and in the absence of added chemical embrittling agents for a time and at a temperature sufficient to embrittle said solid organic fraction without causing substantial pyrolysis, decomposition, or loss in dry weight of said solid organic fraction, comminuting said embrittled solid organic fraction to a powder which is less than a predetermined particle size and recovering said powder for use as a fuel. The solid organic fraction is thereby converted to a densified, easily storable fuel product by the method of the instant invention.

The method of the instant invention is suitable for converting any waste from whatever source, provided such waste has a significant cellulosic fraction. Thus, municipal solid wastes, industrial wastes, agricultural wastes, etc., can be treated by the method of the instant invention provided an economically significant fraction of such waste is cellulosic in nature. Other organic fractions may be present in the waste, such as plastic, rubber, fat, oil, manure, etc., and will contribute to the heating value of the powder fuel recovered from the waste. However, it is believed that the cellulosic fraction is most significantly affected by the method of this invention.

BRIEF DESCRIPTION OF THE FIGURE

The FIGURE describes a flow scheme for the preferred embodiment of the method of the instant invention.

DETAILED DESCRIPTION

The instant invention relates to a method of converting the solid organic fraction of solid waste, e.g. municipal solid waste, into a powdered fuel by heating such solid organic fraction in an inert atmosphere in the absence of any added chemical embrittling agent, such as mineral acids, organic acids, formaldehyde, etc., for a time and at a temperature sufficient to embrittle said solid organic fraction, but insufficient to cause substantial decomposition into gaseous or liquid products, comminuting such embrittled solid organic fraction into a powder, e.g. by grinding, and recovering said powder.

The solid organic fraction may be treated by the method of this invention either after or prior to separation from the remaining waste. For example, after shredding, the organic fraction of the waste might be removed from other components by processes known in the art such as air classification, etc. The solid organic fraction may then be embrittled by the method of this invention and ground into a powder. Alternatively, the shredded waste can be treated by the method of this invention whereby the organic fraction is embrittled and the shredded inorganics in the waste can function as a comminuting aid prior to their separation from the organic fraction.

While the temperature of embrittlement will vary with the nature of the solid waste being embrittled, a temperature of at least 125° C. is required. Optimum temperatures for the embrittlement process at any particular solid waste can be determined in a limited number of experiments by those skilled in the art; however, in general a temperature of from 150° C. to 250° C. is preferred. The temperature should not exceed 275° C. since above that temperature pyrolysis begins to occur and liquid and gaseous decomposition products are obtained which decrease the yield of the powdered fuel.

The time required for such embrittlement will be relative to the temperature as well as the nature of the solid waste. Preferably, because of economics, the time for embrittlement will be less than one (1) hour.

The embrittlement process of the instant invention may be carried out under any inert atmosphere. For the purposes of this specification the term inert atmosphere will means that the oxygen partial pressure should be insufficient to allow significant decomposition of the organic fraction of solid waste. Preferably less than 5% by weight oxygen will be present during the embrittlement reaction with less than 1.0% by weight oxygen even more preferred. The amount of oxygen that can be tolerated without having substantial dry weight loss, as discussed below, is dependent on the temperature at which embrittlement is effected. In the temperature range of from about 160° to 190° C. up to 5% by weight oxygen may be present in the inert gas. At temperatures greater than 190° C., the inert gas should contain no more than about 1% by weight oxygen to avoid substantial dry weight loss. Of course the time span during which the solid waste is held at the above temperatures can be varied to avoid the effects of oxygen, i.e. with lower times higher oxygen content in the inert gas can be tolerated. The above temperature-oxygen relationships are valid for an embrittling time span of from 30 to 60 minutes, which can be conveniently obtained with the equipment available in the art for solid waste embrittlement.

Suitable inert atmospheres include $CO_2$, $N_2$, CO, $H_2$, $H_2O$, etc. For the sake of economy and safety, the embrittlement process may be carried out under an atmosphere generated by a "state of the art" inert gas generator which produces a mixture of nitrogen, carbon oxides and water vapor by the combustion of carbon or hydrocarbons in air in amounts sufficient to substantially convert the oxygen.

The embrittlement process of the instant invention may be carried out in any of the known devices used in municipal solid waste treating. For example, since the embrittled solid waste must be comminuted to less than a predetermined particle size, the embrittlement step can be carried out simultaneously with comminution in any suitable device, or alternatively, the solid waste could be embrittled prior to comminution. It will be appreciated that the embrittlement process will be carried out to the extent suitable for comminuting the embrittled solid organic fraction with a minimum expenditure of energy. It is desirable to recover a solid fuel powder having an average particle size of less than 10 mesh; more preferably less than 20 mesh (Standard Tyler Screen Scale). Therefore, the comminution will be carried out until at least a substantial portion of the embrittled solid organic fraction is less than said predetermined particle size. The partially comminuted powder can be treated to remove particles having greater particle size and the over-sized particles returned to the embrittlement step. Alternatively, comminution can be continued until substantially all of the embrittled solid waste is below the predetermined limit.

The recovered powdered fuel can be burned in its powder form or it may be pelletized either by compression (with or without the use of binders such as starch, etc.). Alternatively, the powder can be slurried with an oil and such slurry utilized as a fuel. In any event, by means of the method of the instant invention, the solid organic fraction of the waste will be densified, and therefore, of a much decreased volume. Of course, a densified material is more easily handled. It has been found that the flowability of embrittled and comminuted solid waste is superior to shredded solid waste prepared by other size reduction methods such as a tearing or shredding mill because the measured angle of repose is 30° instead of 90° or more. The significance of the angle of repose is discussed further below, however it should be noted that examples of other free flowing materials (having an angle of repose of from 30° to 40°) include soda ash, dry fly ash, powdered carbon black, and Fuller's earth. An example of sluggish flowability (angle of repose 45°) is asbestos shred. It will be appreciated that conveyer choices and feeder selection depend on the flowability.

Furthermore, in the densified state the solid organic waste is more economical to store. Storage and handling volumes depend on bulk densities which are superior for embrittled and comminuted waste as compared to other shredded waste. More particularly the embrittled comminuted waste will have a bulk density of about 32 vs. 10 lbs/ft. 3 for the other shredded waste.

The objective of this invention is to provide this densified, easily stored material without significant loss of the heating value of the solid organic fraction. In the instant process, the embrittlement conditions are maintained so that no pyrolysis or substantial decomposition occurs, i.e. dry weight loss is held to no more than 10%, preferably no more than 5% of the heating value of the solid organic fraction is lost in the conversion to powdered fuel.

DESCRIPTION OF THE PREFERRED EMBODIMENT

The FIGURE shows a complete scheme to process municipal solid waste (MSW) into valuable materials, which scheme includes the conversion of the solid organic fraction of MSW into a powdered fuel by the instant novel embrittling method. There is provided a waste collection storage and transfer area where dump trucks (11) or similar refuse transport units are continuously employed to deposit municipal solid waste for processing and recovery of valuable materials contained therein.

After the removal of the oversized bulky waste, e.g. refrigerators, etc., the MSW may be dumped directly on to a conveyor (not shown) for transfer to the primary shredder 12. The primary shredder may be a ring grinder, attrition mill, impact mill, hammer mill or the like. A hammer mill is preferred for shredding efficiency and relatively low maintenance requirements.

The shredder comminutes the waste independent of its makeup to a size suitable for classification into a predominantly organic and inorganic fraction. Approximately 80% or more of the feed to the primary shredder is comminuted to a size of about 4 inches or less.

The comminuted MSW is conveyed to a magnetic separator 13 wherein a ferrous metal fraction comprising substantially all of the ferrous metals, such as shredded tin cans, is removed from the comminuted MSW by magnetic separation. The ferrous metal-free, comminuted MSW remaining after magnetic separation is transferred to an air-classifier 14 by suitable conveying means. In the air-classifier, the separation of the ferrous metal-free, comminuted MSW into a light organic fraction and a heavy inorganic fraction is obtained. As shown the air-classifier provides a zig-zag path for particles and air flow. The purpose is to impart a stop-start tumbling process to particles with many different exposures to upwardly flowing air and the downward force of gravity. The end result is the elutriation of the light organic fraction from the ferrous metal-free comminuted MSW fed to the air-classifier. The elutriated organic fraction is transported to the dryer 15 by conveyor means. The heavy inorganic fraction from the air-classifier may be subjected to further comminution (comminution means not shown in Figure) prior to sending such heavy inorganic fraction to a trommel screen 16 herein the smaller particle fraction of such heavy inorganic fraction is removed therefrom. Other methods for separating the ferrous metal-free, comminuted MSW into an organic fraction and an inorganic fraction are known in the art and may be substituted for the air-classification disclosed herein. Alternatively, the organic fraction may be separated from the comminuted MSW prior to the removal of the ferrous metal fraction although this method is less preferred.

At the trommel screen the heavy inorganic fraction is separated into essentially two separate fractions. The large particle fraction, for example, in the range of about from 0.5 inches to about 3 to 4 inches contains a proportionally high percentage of aluminum and is, therefore, transferred to eddy-current separator 17 which separates non-ferrous metals, namely aluminum, for sale. A suitable eddy-current separator is described in U.S. Pat. No. 3,950,661 hereby incorporated by reference for that purpose. The small particle fraction, from the trommel screen, that is, the fraction that is 0.5 inches and less, is rich in glass and, therefore, may be conveyed to the glass recovery operation described further below. Other methods for classifying the heavy inorganic fraction into the above described small and large particles fractions may be substituted for the preferred trommel screen.

The elutriated organic fraction from the air-classifier is sent to dryer 15 wherein it is treated at a sufficient temperature in the presence of a dry gas, to reduce the moisture content of such fraction. The elutriated organic fraction preferably comprises at least 85% by weight organic materials on a dry basis and the remainder is finely divided inorganics such as glass. Drying may be carried out by either direct or indirect heating in equipment known in the art. For example, flue gas can be passed through the organic fraction in a drum dryer. Upon exiting the dryer, preferably the moisture content of such organic fraction will be less than about 10% by weight. The dry organic fraction exiting dryer 15 is conveyed to a screen 18 to separate larger organic particles from any residual recoverable inorganic constituent such as glass, which may have eluded classification in the air classifier 14. Since the density of inorganic particles typically is greater than the density of the organic particles, any inorganic particles carried overhead in the air classifier tend to be smaller than the organic particles carried overhead. Therefore, predominantly inorganic particles fall through screen 18. The oversized materials from screen 18, i.e. the organic particles, are sent to the embrittling reactor 19 further described below.

The finely divided inorganic particles falling through screen 18 are conveyed to an air table 20, wherein glass is separated from other inorganics to facilitate the recovery of the glass in the froth flotation unit described below. A typical air table, also referred to as a gravity separator, comprises a perforated platform with a series of riffles running lengthwise. The platform can be inclined in a single plane or in two planes. In operation, the inorganic particles are placed on the high point of the platform and the platform is vibrated in two directions. In one direction the vibrator has high acceleration and in the other direction a lower acceleration.

Air is blown through the perforations of the air table by a blower (not shown) which gives the inorganic particles a slight lift. The lighter material which is about 40% or more glass, generally jumps the riffles and falls off the side of the table opposite the heavier material, which follows the riffles along the length of the table and falls off into a reject bin. This reject may be used for landfill.

The glass from air table 20 is conveyed to a froth-flotation unit 21, preferably after slurrying with water. As shown, the glass recovered from the air table may be admixed with the small particle fraction from the trommel screen 16 prior to treatment in the froth-flotation unit 21. Methods for froth-flotation of glass collected from a municipal solid waste treating processes are known in the art and they are not described further herein. A suitable method of recovering the glass fraction by froth flotation is disclosed in U.S. Pat. No. 4,077,847, hereby incorporated by reference.

The oversize materials from the screen 18 are conveyed to embrittling reactor 19 by any suitable conveying means. Embrittling reactor 19 may be a rotary drum drier or other means known in the art for providing heat to a finely divided organic material. Means for providing an inert atmosphere are also associated with said embrittling reactor. The reaction takes place at a temperature of at least 125° C., preferably from about 150° C. to 250° C., in the absence of any added chemical embrittling agent. The residence time in the embrittling reactor is generally 30 to 60 minutes. The embrittled material is conveyed from reactor 19 to comminution apparatus 22 which may be, for example, a ball mill, an attrition mill, a hammer mill, etc. Of course, the embrittling and comminution can take place in a single unit as will be appreciated by those skilled in the art.

The embrittled material is comminuted until at least 25 weight % of the embrittled material has a particle size of less than 10 mesh. The comminuted material is conveyed to a screen 23 wherein the oversized particles are removed and sent back through the embrittling reactor. Particles which pass through the screen are recovered as a powdered fuel.

I claim:

1. A method of converting the solid organic fraction of waste into a powdered fuel which comprises heating said solid organic fraction in an inert atmosphere, in the absence of any added chemical embrittling agent, selected from the group consisting of mineral acids, organic acids and formaldehyde, for a time and at a temperature sufficient to embrittle said solid organic fraction without causing substantial pyrolysis, substantial decomposition or substantial loss in dry weight of said solid organic fraction, comminuting said embrittled solid organic fraction to a powder and recovering said powder.

2. The method of claim 1 wherein said dry weight loss is less than 10%.

3. The method of claim 1 wherein said inert atmosphere comprises less than 5% by weight oxygen.

4. The method of claim 1 wherein the embrittlement takes place at a temperature of at least 125° C.

5. The method of claim 1 wherein a substantial fraction of said embrittled solid organic fraction is comminuted to a particle size of less than 10 mesh.

6. The method of claim 5 wherein said fraction having a particle size of less than 10 mesh is recovered by screening said comminuted, embrittled solid organic fraction.

7. The method of claim 1 wherein said embrittlement is carried out under an atmosphere comprising a mixture of nitrogen and oxides of carbon and water vapor.

8. The method of claim 1 wherein said solid organic is separated from the waste prior to embrittling.

9. The method of claim 1 wherein said embrittlement is carried out at conditions whereby the loss of heating value in the conversion of said solid organic fraction into powdered fuel is less than 10%.

10. The method of claim 1 wherein the embrittlement takes place at a temperature of from about 150° C. to about 250° C.

11. A method for separating municipal solid waste (MSW), comprising an inorganic fraction; including glass, ferrous metals and aluminum; and a solid organic fraction, into valuable materials which comprises:

(a) shredding the MSW to provide a comminuted MSW;

(b) separating a ferrous metal fraction from said comminuted MSW and recovering a substantially ferrous metal-free fraction;

(c) separating said substantially ferrous metal-free fraction into an inorganic fraction, which includes glass and aluminum and a solid organic fraction;

(d) comminuting such inorganic fraction to provide an aluminum-rich fraction having a particle size greater than 0.5 inches and a glass rich fraction having a particle size of less than 0.5 inches;

(e) separating such aluminum-rich fraction from said glass-rich fraction;

(f) recovering glass from said glass-rich fraction;

(g) recovering aluminum from said aluminum-rich fraction;

(h) heating said solid organic fraction of step (c) in an inert atmosphere, in the absence of any added chemical embrittling agent, selected from the group consisting of mineral acids, organic acids and formaldehyde, for a time and at a temperature sufficient to embrittle said solid organic fraction without causing substantial decomposition, substantial pyrolysis, or substantial loss in dry weight of said solid organic fraction;

(i) comminuting said embrittled solid organic fraction to a powder; and (j) recovering said powder.

12. The method of claim 11 wherein said dry weight loss is less than 10%.

13. The method of claim 12 wherein the embrittlement takes place at a temperature of at least 125° C.

14. The method of claim 12 wherein a substantial fraction of said embrittled solid organic fraction is comminuted to a particle size of less than 10 mesh.

15. The method of claim 12 wherein said fraction having a particle size of less than 10 mesh is recovered by screening said comminuted, embrittled solid organic fraction.

16. The method of claim 12 wherein said embrittlement is carried out under an atmosphere comprising a mixture of nitrogen and oxides of carbon and water vapor.

17. The method of claim 12 wherein said embrittlement is carried out at conditions whereby the loss of heating value in the conversion of said solid organic fraction into powdered fuel is less than 10%.

18. The method of claim 12 wherein the embrittlement takes place at a temperature of from about 150° C. to about 250° C.

19. The method of claim 1 wherein said powder has an angle of repose of 45° or less.

20. The method of claim 11 wherein said powder has an angle of repose of 45° or less.

* * * * *